(12) United States Patent
Register

(10) Patent No.: US 10,906,210 B2
(45) Date of Patent: Feb. 2, 2021

(54) MANDREL FOR COMPOSITE PART FABRICATION AND REPAIR

(71) Applicant: The Boeing Company, Chicago, IL (US)

(72) Inventor: Justin H. Register, Charleston, SC (US)

(73) Assignee: The Boeing Company, Chicago, IL (US)

( * ) Notice: Subject to any disclaimer, the term of this patent is extended or adjusted under 35 U.S.C. 154(b) by 812 days.

(21) Appl. No.: 15/415,466

(22) Filed: Jan. 25, 2017

(65) Prior Publication Data

US 2018/0207840 A1 Jul. 26, 2018

(51) Int. Cl.
| | |
|---|---|
| *B29C 33/48* | (2006.01) |
| *B29C 70/34* | (2006.01) |
| *B29C 73/04* | (2006.01) |
| *B29D 99/00* | (2010.01) |
| *B29C 73/26* | (2006.01) |
| *B29C 70/44* | (2006.01) |

(Continued)

(52) U.S. Cl.
CPC .......... *B29C 33/485* (2013.01); *B29C 70/342* (2013.01); *B29C 70/446* (2013.01); *B29C 73/04* (2013.01); *B29C 73/26* (2013.01); *B29D 99/0014* (2013.01); *B29K 2105/0872* (2013.01); *B29L 2031/3082* (2013.01)

(58) Field of Classification Search
CPC .................................................. B29C 70/446
See application file for complete search history.

(56) References Cited

U.S. PATENT DOCUMENTS

| 2,460,325 A | 2/1949 | Whitson et al. |
|---|---|---|
| 4,310,138 A | 1/1982 | Johnston |

(Continued)

FOREIGN PATENT DOCUMENTS

| FR | 3 018 719 | 9/2015 |
|---|---|---|
| JP | S59 1026 | 1/1984 |

(Continued)

OTHER PUBLICATIONS

Co-Pending U.S. Appl. No. 15/005,156, filed Jan. 25, 2016, titled "Electromagnetic Support Tooling for Composite Part Curing."

(Continued)

*Primary Examiner* — Ryan M Ochylski
(74) *Attorney, Agent, or Firm* — McDonnell Boehnen Hulbert & Berghoff LLP

(57) ABSTRACT

In an example, a mandrel for a composite part includes an upper-mandrel portion, a lower-mandrel portion, and a mid-mandrel portion between the upper-mandrel portion and the lower-mandrel portion. The mandrel also includes a cavity and an exterior surface defined by the upper-mandrel portion, the lower-mandrel portion, and the mid-mandrel portion. An actuator is movable in the cavity between a first position and a second position. The exterior surface can support the composite part. A perimeter of the exterior surface has a first length when the actuator is in the first position and the perimeter has a second length when the actuator is in the second position. The first length is greater than the second length such that the mandrel is in an expanded state when the actuator is in the first position and the mandrel is in a contracted state when the actuator is in the second position.

20 Claims, 15 Drawing Sheets

(51) Int. Cl.
  *B29K 105/08*     (2006.01)
  *B29L 31/30*      (2006.01)

(56) References Cited

U.S. PATENT DOCUMENTS

| | | |
|---|---|---|
| 9,096,043 B2 | 8/2015 | Lee et al. |
| 2006/0108057 A1 | 5/2006 | Pham et al. |
| 2013/0181374 A1 | 7/2013 | Ender |
| 2013/0298365 A1 | 11/2013 | Sibona et al. |
| 2014/0314996 A1 | 10/2014 | Stewart |
| 2015/0246718 A1 | 9/2015 | Aitken et al. |
| 2016/0001467 A1 | 1/2016 | Gunther et al. |
| 2016/0200008 A1 | 7/2016 | Nguyen et al. |
| 2017/0100859 A1 | 4/2017 | Register |

FOREIGN PATENT DOCUMENTS

| | | |
|---|---|---|
| WO | 2007/148301 A2 | 12/2007 |
| WO | WO 2014/172073 | 10/2014 |

OTHER PUBLICATIONS

Co-Pending U.S. Appl. No. 14/879,122, filed Oct. 9, 2015, titled "Mechanical Support Tooling and/or Mandrel for Composite Part Curing."
Co-Pending U.S. Appl. No. 15/096,800, filed Apr. 12, 2016.
Extended European Search Report prepared by the European Patent Office in application No. EP 17 20 3705.3 dated Jun. 28, 2018.
Invitation to Respond to Written Opinion prepared by the Intellectual Property Office of Singapore in patent application No. 10201709858V, dated Apr. 28, 2020.
European Office Action issued by the European Patent Office in European Patent Application No. 17203705.3, dated Dec. 2, 2020 (5 pages).

MANDREL FOR COMPOSITE PART FABRICATION AND REPAIR

FIELD

The present disclosure generally relates to systems and methods for composite parts, and more particularly to a mandrel system and methods for forming and/or repairing composite parts.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may require a tool such as a supporting bladder, which is placed in the cavity to ensure that the part geometry is properly maintained during application of composite material or when processed under autoclave pressure. The supporting bladder may be an inflatable bladder that can easily fit into an internal cavity prior to cure and then be inflated during an autoclave cure process so as to react to the autoclave pressure force applied to the part. Typically, such inflatable bladders are pressurized by venting them to the autoclave pressure through a vacuum bag.

However, the bladders that are used to support a composite part (e.g., a stringer or other longitudinal structural piece in a framework) for autoclave curing may not be suitable when alternatively curing the part out-of-autoclave (e.g., as performed with repairs). In this case, the part and the bladder are exposed to different temperature and pressure conditions than in an autoclave such that an inflatable bladder may not perform properly and could in fact negatively impact final part characteristics. This creates a need for a support tool that can fit into a composite part cavity prior to cure, can conform to the internal geometry of the part cavity during out-of-autoclave curing, and finally can reduce in size to be removed from the part after cure.

SUMMARY

In an example, a mandrel for a composite part is described that includes an upper-mandrel portion, a lower-mandrel portion, and a mid-mandrel portion between the upper-mandrel portion and the lower-mandrel portion. The mandrel also includes a cavity defined by the upper-mandrel portion, the lower-mandrel portion, and the mid-mandrel portion, and an actuator movable in the cavity between a first position in the cavity and a second position in the cavity. The mandrel further includes an exterior surface defined by the upper-mandrel portion, the lower-mandrel portion, and the mid-mandrel portion. The exterior surface is configured to support the composite part. A perimeter of the exterior surface has a first length when the actuator is in the first position in the cavity and the perimeter has a second length when the actuator is in the second position in the cavity. The first length is greater than the second length such that the mandrel is in an expanded state when the actuator is in the first position and the mandrel is in a contracted state when the actuator is in the second position.

In another example, a method of repairing a part with a mandrel is described that includes configuring a mandrel in a contracted state. The mandrel includes an upper-mandrel portion, a lower-mandrel portion, and a mid-mandrel portion between the upper-mandrel portion and the lower-mandrel portion. The mandrel also includes a cavity defined by the upper-mandrel portion, the lower-mandrel portion, and the mid-mandrel portion. The mandrel further includes an actuator, which is movable in the cavity between a first position in the cavity and a second position in the cavity, and an exterior surface defined by the upper-mandrel portion, the lower-mandrel portion, and the mid-mandrel portion. A perimeter of the exterior surface has a first length when the actuator is in the first position in the cavity and the perimeter has a second length when the actuator is in the second position in the cavity. The first length is greater than the second length such that the mandrel is in an expanded state when the actuator is in the first position and the mandrel is in the contracted state when the actuator is in the second position.

The method of repairing the part also includes inserting the mandrel, in the contracted state, in an interior space of a part. After inserting the mandrel in the interior space of the part, the method includes moving the actuator from the second position to the first position to expand the mandrel from the contracted state to the expanded state. While the mandrel is in the expanded state, the method includes repairing the part. After repairing the part, the method includes moving the actuator from the first position to the second position to contract the mandrel from the expanded state to the contracted state. After contracting the mandrel, the method includes removing the mandrel from the interior space of the part.

In another example, a method of forming a part with a mandrel is described that includes laying up a plurality of layers on a trough and positioning a mandrel, in an expanded state, on the plurality of layers in the trough. The mandrel includes an upper-mandrel portion, a lower-mandrel portion, and a mid-mandrel portion between the upper-mandrel portion and the lower-mandrel portion. The mandrel also includes a cavity defined by the upper-mandrel portion, the lower-mandrel portion, and the mid-mandrel portion. The mandrel further includes an actuator, which is movable in the cavity between a first position in the cavity and a second position in the cavity, and an exterior surface defined by the upper-mandrel portion, the lower-mandrel portion, and the mid-mandrel portion. A perimeter of the exterior surface has a first length when the actuator is in the first position in the cavity and the perimeter has a second length when the actuator is in the second position in the cavity. The first length is greater than the second length such that the mandrel is in an expanded state when the actuator is in the first position and the mandrel is in the contracted state when the actuator is in the second position.

The method of forming the part also includes positioning a fuselage skin on the plurality of layers to form an interior space between the plurality of layers and the fuselage skin. The mandrel is in the interior space. The method further includes co-curing the plurality of layers and the fuselage skin, and moving the actuator from the first position to the second position to contract the mandrel from the expanded state to the contracted state. After contracting the mandrel, the method includes removing the mandrel from the interior space.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
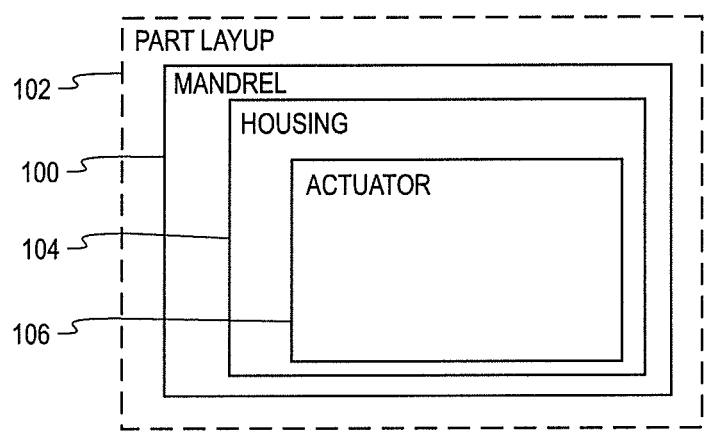
FIG. 1 illustrates an example system including a mandrel be used to form and/or repair composite part, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, a mandrel for composite part fabrication and/or repair is described. Additionally, methods for forming a composite part and/or repairing a composite part with the mandrel are described. The mandrel can include a housing having a plurality mandrel portions that are positioned to form a cavity and an exterior surface. The exterior surface can support a composite part during fabrication and/or repair. The mandrel also includes an actuator that is movable in the cavity between a first position in the cavity and a second position in the cavity. When the actuator is in the first position in the cavity, a perimeter of the exterior surface has a first length. When the actuator is in the second position in the cavity, the perimeter of the exterior surface has a second length. In an example, the first length is greater than the second length such that the mandrel is in an expanded state when the actuator is in the first position and the mandrel is in a contracted state when the actuator is in the second position.

In the expanded state, the mandrel can fill an interior space of the composite part to support the composite part during a fabrication and/or repair process. Whereas, in the contracted state, the mandrel can be inserted into and/or withdrawn from the interior space of the composite part with relative ease and with little (or no) risk of damage to the composite part. Beneficially, the mandrel can also support the composite part during repairs, which may involve applying of out-of-autoclave and/or vacuum bag cure pressure. The mandrel is further reusable since the mandrel can be reduced in size before and/or after cure to be removed from the part.

Within examples, the housing can include an upper-mandrel portion, a lower-mandrel portion, and a mid-mandrel portion between the upper-mandrel portion and the lower-mandrel portion. The upper-mandrel portion, the lower mandrel portion, and/or the mid-mandrel portion can be movable relative to each other to transition the mandrel between the contracted state and the expanded state. The relative movement of the upper-mandrel portion, the lower-mandrel portion, and the mid-mandrel portion can be responsive to an engagement between the actuator and one or more of these portions of the housing as the actuator moves within the cavity between the first position and the second position.

For instance, in one example, the mid-mandrel portion can include a first mid-mandrel portion and a second mid-mandrel portion, and the actuator can urge the first and second mid-mandrel portions outwardly away from each other as the actuator moves from the second position to the first position. In an implementation, the first mid-mandrel portion and the second mid-mandrel portion can responsively urge the upper-mandrel portion and the lower-mandrel portion away from each other so that the mandrel expands upwardly, downwardly, and laterally when transitioning from the contracted state to the expanded state. Similarly, the mandrel can contract in the same directions when transitioning from the expanded state to the contracted state due to the engagement of the actuator with the portions of the housing and/or the engagement of the portions of the housing with each other.

Also, within examples, the upper-mandrel portion, the lower-mandrel portion, and the mid-mandrel portion can each have a plurality of kerfs along a longitudinal axis extending from a first end of the mandrel to a second end of the mandrel. The kerfs can beneficially facilitate bending the mandrel along a non-linear or arcing contour of an interior space of a composite part. Additionally or alternatively, the actuator can include a plurality of actuator segments coupled to one another by linkages that facilitate bending the actuator along the non-linear or arcing contour of the interior space of the composite part.

Referring now to FIG. 1, a mandrel 100 can be used to form and/or cure a part layup 102 including multiple plies or layers (not shown) of fiber reinforced polymer resin, according to an example. For example, multiple layers of fiber reinforced polymer layers are laid up over the mandrel 100 to form the layers into a desired part shape. The part layup 102 can partially or fully surround the mandrel 100, such that the mandrel 100 is at least substantially enclosed by the part layup 102.

The mandrel 100 includes a housing 104 in which an actuator 106 is positioned. The housing 104 forms an enclosure that can expand outwardly to an expanded state and contract inwardly to a contracted state to responsive to the actuator 106 moving within the housing 104. As described in detail below, the mandrel 100 can support the part layup 102 during lay-up and/or cure in the expanded state, and the mandrel 100 can be inserted and/or withdrawn from the part layup 102 in the contracted.

In one example, the mandrel 100 can be formed of an elastomeric material, such as Teflon® (E.I. du Pont de Nemours and Company) coated silicone or hard rubber, and may be pliable to enable the mandrel 100 to conform to various configurations. The housing 104 can be formed, for example, from flexible silicon rubber, and thus, the housing 104 can be a flexible housing or an elastomeric housing such that the housing 104 may contact the uncured part layup 102 without damage to the part layup 102 and/or without contamination to the part layup 102. In an additional or alternative example, the mandrel 100 can be formed by an additive manufacturing process such as, for instance, a three-dimensional printing process.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. In general, the mandrel 100 can be used to cure a variety of composite resin parts of various geometries, having one or more internal cavities.

Figure 2:
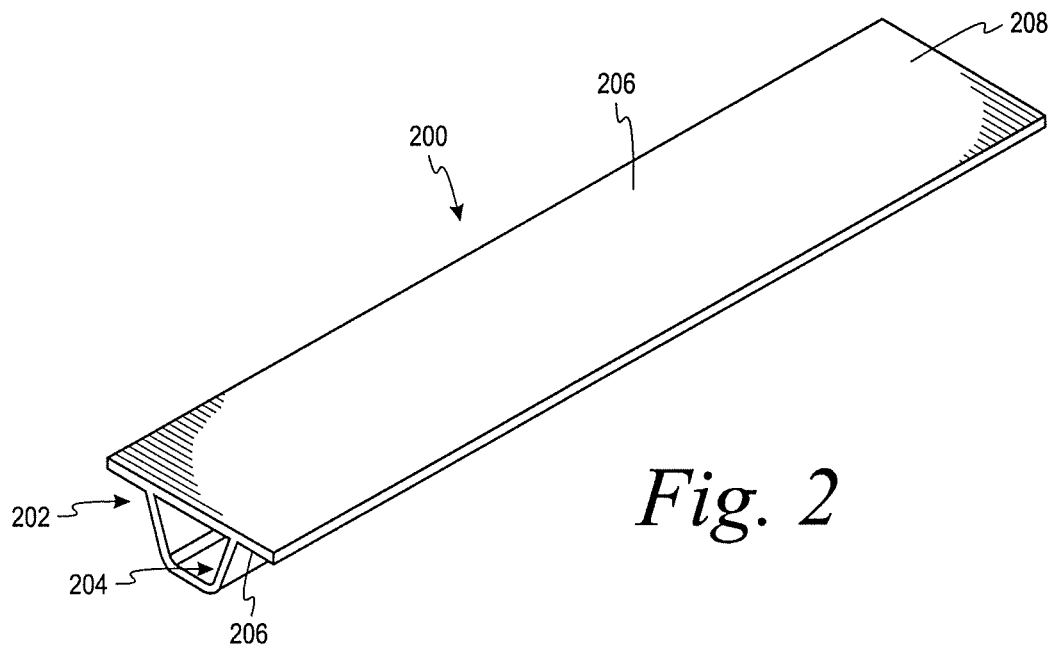
FIG. 2 illustrates an example of a composite part that may benefit from use of the mandrel, according to an example embodiment.

FIG. 2 illustrates an example of a composite part 200 that may benefit from use of the mandrel 100 to form the part layup 102. The composite part 200 is a fiber reinforced composite resin stringer. As shown in FIG. 2, the composite part 200 includes a hat section 202 forming an interior space 204, a pair of laterally extending flange sections 206, and a substantially flat fuselage skin section 208 that is consolidated together with the flange sections 206 during curing. As those of ordinary skill in the art will recognize, alternative stringer geometries are possible.

Example composite material used for the composite part 200 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 100 (or mold) to pre-form the tape or fabric into a desired shape of the composite part 200 as defined by the mandrel 100. The composite part 200 can be any suitable dimension to provide various degrees of reinforcement, and could comprise any number of layers of prepreg tape or fabric.

Figure 3A:
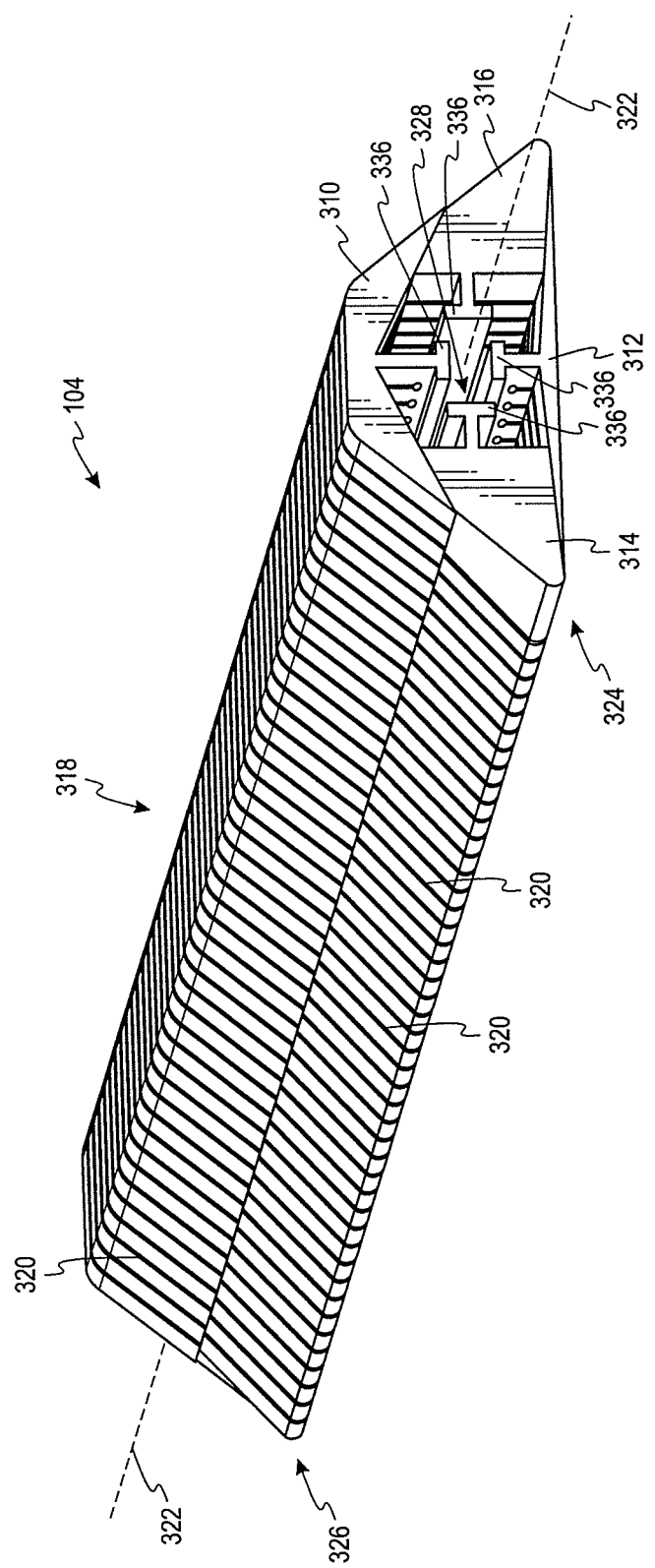
FIG. 3A illustrates an example housing of a mandrel according to an example embodiment.

FIG. 3A depicts a perspective view of the housing 104 of the mandrel 100 according to one example. As shown in FIG. 3A, the housing 104 includes an upper-mandrel portion 310, a lower-mandrel portion 312, a first mid-mandrel portion 314, and a second mid-mandrel portion 316. The first mid-mandrel portion 314 and the second mid-mandrel portion 316 are positioned between the upper-mandrel portion 310 and the lower-mandrel portion 312. In one example, the upper-mandrel portion 310, the lower-mandrel portion 312, the first mid-mandrel portion 314, and the second mid-mandrel portion 316 are separate structures; however, in alternative examples, the upper-mandrel portion 310, the lower-mandrel portion 312, the first mid-mandrel portion 314, and/or the second mid-mandrel portion 316 can be integrally formed in a manner that allows for relative movement between the respective portions 310, 312, 314, and 316 of the housing 104.

In this arrangement, the housing 104 includes an exterior surface 318 defined by the upper-mandrel portion 310, the lower-mandrel portion 312, the first mid-mandrel portion 314, and the second mid-mandrel portion 316. The exterior surface 318 is configured to support the composite part 200. In FIG. 3A, the housing 104 has a substantially trapezoidal shape. This trapezoidal shape works well to fill the interior space 204 of the composite part 200, shown in FIG. 2, for curing. In other examples, the housing 104 can be configured in other shapes as needed to fill a specific cavity of a composite part. As examples, the housing 104 can be rectangular or square instead of a triangular shape. In still other examples, the housing 104 can form a rounded hat shape, or still other shapes are possible depending on application of the mandrel 100.

Although the composite part 200 shown in FIG. 2 has a linear shape, the composite part 200 can have a non-linear shape in alternative examples. As shown in FIG. 3A, the upper-mandrel portion 310, the lower-mandrel portion 312, the first mid-mandrel portion 314, and the second mid-mandrel portion 316 each have a plurality of kerfs 320 along a longitudinal axis 322 extending from a first end 324 of the mandrel 100 to a second end 326 of the mandrel 100. The kerfs 320 can facilitate bending the mandrel 100 along a non-linear contour and/or an arcing contour of the composite part 200.

Additionally or alternatively, the kerfs 320 can facilitate expanding and/or contracting the housing 104, as will be described in further detail below. In the example of FIG. 3A, the kerfs 320 of the mid-mandrel portions 314, 316 extend from the lower-mandrel portion 312 to the upper-mandrel portion 310 at an angle in a direction from the first end 324 to the second end 326. This mitigates potential interference issues that could arise as surfaces of the mandrel portions 310, 312, 314, 316 slide against one another during the expansion or contraction of the mandrel 100. As an example, the angle of the kerfs 320 can be approximately 115 degrees to approximately 125 degrees relative to the longitudinal axis 322.

In FIG. 3A, the kerfs 320 of the upper-mandrel portion 310 and the lower-mandrel portion 312 are substantially perpendicular to the longitudinal axis 322; however, the kerfs 320 of the upper-mandrel portion 310 and the lower-mandrel portion 312 can also be provided at an angle similar to the angle of the kerfs 320 of the first mid-mandrel portion 314 and the second mid-mandrel portion 316 in alternative examples.

As further shown in FIG. 3A, the upper-mandrel portion 310, the lower-mandrel portion 312, the first mid-mandrel portion 314, and the second mid-mandrel portion 316 define a cavity 328. The cavity 328 extends from the first end 324 of the housing 104 to the second end 326 of the housing 104. As noted above, the cavity 328 receives the actuator 106 of the mandrel 100.

Figure 3B:
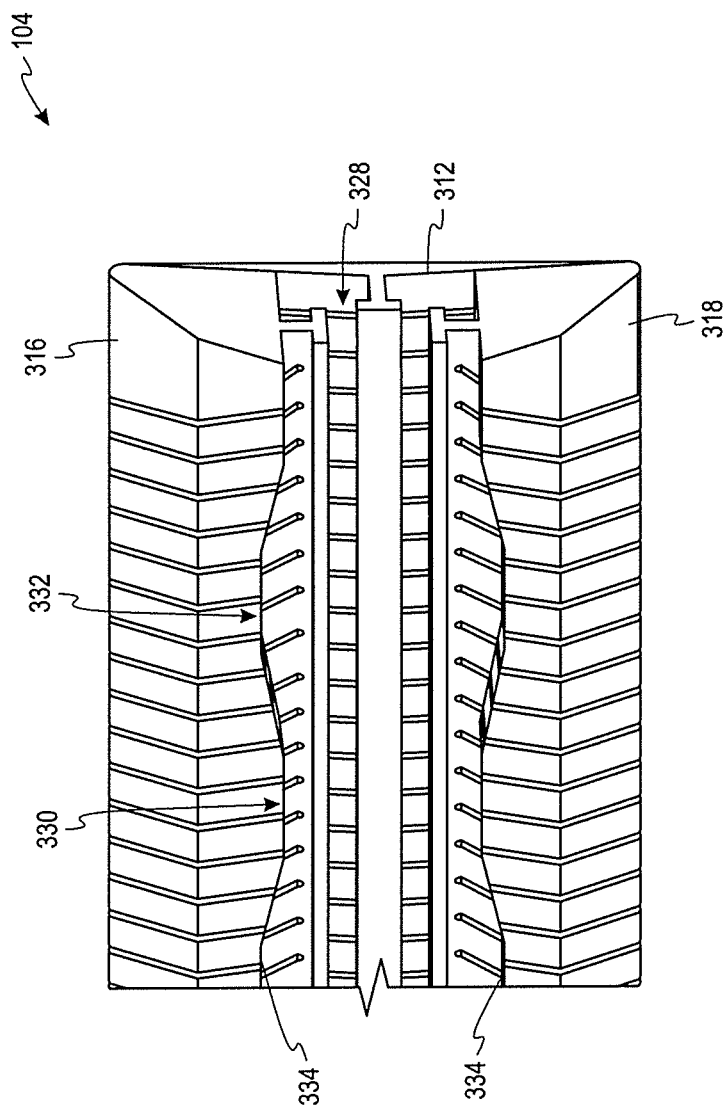
FIG. 3B illustrates a top plan view of a portion of the housing in FIG. 3A.

FIG. 3B illustrates a portion of the housing 104 with the upper-mandrel portion 310 removed to expose the cavity 328. As shown in FIG. 3B, the cavity 328 includes a plurality of sections having a plurality of different dimensions. For example, in FIG. 3B, the cavity 328 includes a first section 330 and a second section 332. A width of the cavity 328 in the first section 330 is smaller than the width of the cavity 328 in the second section 332. Additionally, the side walls 334 of the cavity 328 have ramped contours between the first section 330 and the second section 332. The ramped contours can facilitate movement of the actuator 106 between the first section 330 and the second section 332 in the cavity 328 by providing a relatively gradual change in the width of the cavity 328. In an example, the guide protrusions 336 can be also be ramped at one or more locations in an opposing way so that the mandrel 100 can contract when the actuator 106 moves across the ramped contours of the cavity 328.

Referring back to FIG. 3A, the housing 104 of the mandrel 100 also includes a plurality of guide protrusions 336 that extend into the cavity 328 from the upper mandrel-portion 310, the lower-mandrel portion 312, the first mid-mandrel portion 314, and the second mid-mandrel portion 316. The guide protrusions 336 can receive a correspondingly shaped feature of the actuator 106 to guide movement of the actuator 106 within the cavity 328 along the longitudinal axis 322. In FIG. 3A, the guide protrusions 336 are T-shaped; however, the guide protrusions 336 can a different shape in other examples. For instance, in other examples, the guide protrusions 336 can be circle-shaped or semi-circular shaped.

Figure 4A:
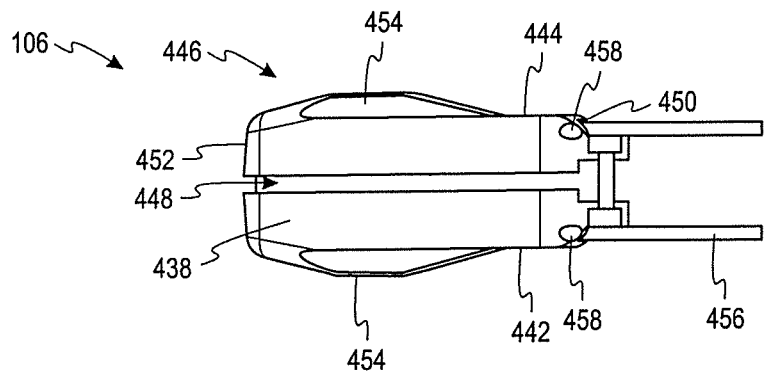
FIG. 4A illustrates a top plan view of an actuator of a mandrel according to an example embodiment.
Figure 4B:
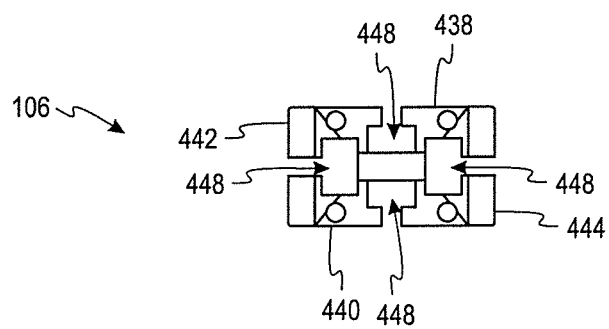
FIG. 4B illustrates an end plan view of the actuator in FIG. 4A.
Figure 4C:
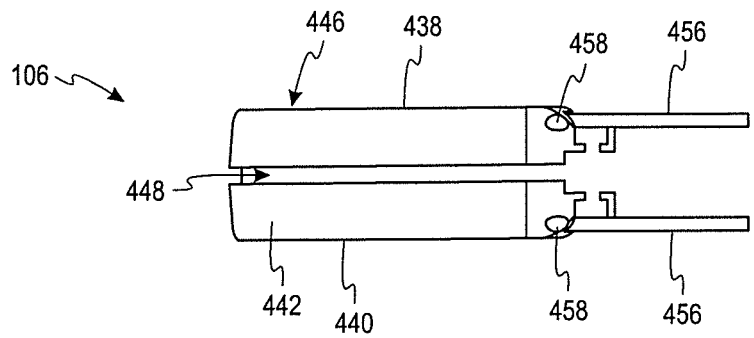
FIG. 4C illustrates a side plan view of the actuator in FIG. 4A.

FIGS. 4A-4C depict a section of the actuator 106 according to an example. As shown in FIGS. 4A-4C, the actuator 106 has an upper surface 438, a lower surface 440, a first side surface 442, and a second side surface 444. The upper surface 438, the lower surface 440, the first side surface 442, and the second side surface 444 define an outer surface 446 of the actuator 106.

The actuator 106 includes a plurality of guide slots 448 on the upper surface 438, the lower surface 440, the first side surface 442, and the second side surface 444 of the actuator 106. Each of the guide slots 448 can receive a respective one of the guide protrusions 336 of the housing 104 to guide movement of the actuator 106 between a first position in the cavity 328 and a second position in the cavity 328. In FIGS. 4A-4C, the guide slots 448 are also T-shaped; however, the guide slots 448 can have a different shape in other examples so as to receive differently shaped guide protrusions 336.

As also shown in FIG. 4A, the outer surface 446 of the actuator 106 increases in width (i.e., a dimension extending generally in a direction from the first side surface 442 to the second side surface 444) from a front end 450 to a flange portion 454 on the first side surface 442 and the second side surface 444, and decreases in width from the flange portion 454 to a back end 452 of the actuator 106. The first side surface 442 and the second side surface 444 of the actuator 106 can thus have a ramped surface profile. This can further facilitate moving the actuator 106 between the first section 330 and the second section 332 in the cavity 328.

As shown in FIGS. 4A and 4C, a linkage 456 can be coupled to the actuator 106 by a plurality of pins 458. For instance, each pin 458 can extend through a respective slot (not shown) in actuator 106 to couple the linkage 456 to the actuator 106. The linkage 456 can provide for coupling multiple sections of the actuator 106 to one another so as to form an actuator 106 with a length that is at least as long as a length of the housing 104 and/or the composite part 200. Additionally or alternatively, the linkage 456 can extend out of the cavity 328 to provide a mechanism for moving the actuator 106 relative to the housing 104. In one implementation, a user can manually pull the linkage 456 to move the actuator 106 within the cavity 328. In an additional or alternative implementation, the linkage 456 can be coupled to a device (not shown) that autonomously or semi-autonomously pulls the linkage 456 to move the actuator 106 within the cavity 328.

As noted above, the actuator 106 is movable in the cavity 328 between a first position in the cavity 328 and a second position in the cavity 328. When the actuator 106 is in the first position in the cavity 328, a perimeter of the exterior surface 318 has a first length. When the actuator 106 is in the second position in the cavity 328, the perimeter of the exterior 318 surface has a second length. In an example, the first length is greater than the second length such that the mandrel 100 is in the expanded state when the actuator 106 is in the first position and the mandrel 100 is in the contracted state when the actuator 106 is in the second position. For instance, in the example illustrated in FIGS. 3-4C, the actuator 106 is in the first position when the actuator 106 is positioned in the first section 330 of the cavity 328 and the actuator 106 is in the second position when the actuator 106 is positioned in the second section 332 of the cavity 328.

Figure 5A:
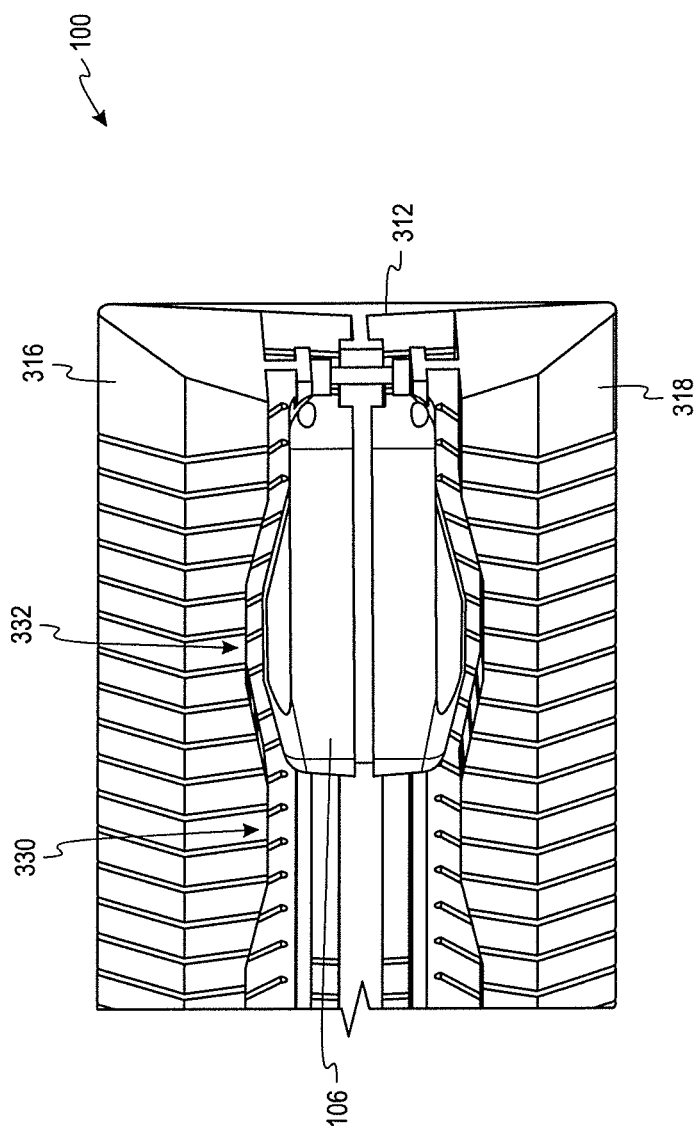
FIG. 5A illustrates a top plan view of a portion of a mandrel with the actuator in one position within a cavity of the mandrel according to an example embodiment.
Figure 5B:
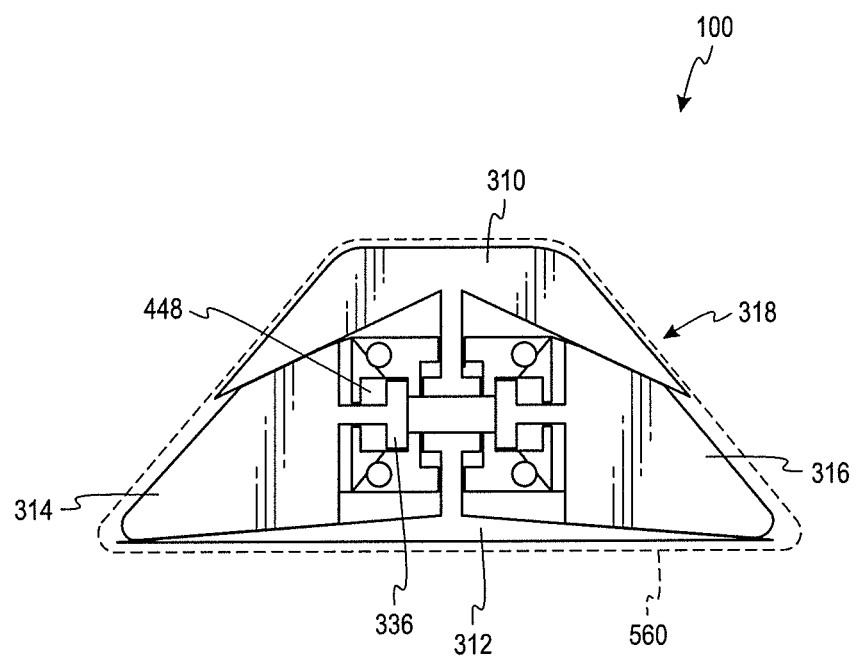
FIG. 5B illustrates an end plan view of a mandrel in a contracted state according to an example embodiment.
Figure 6A:
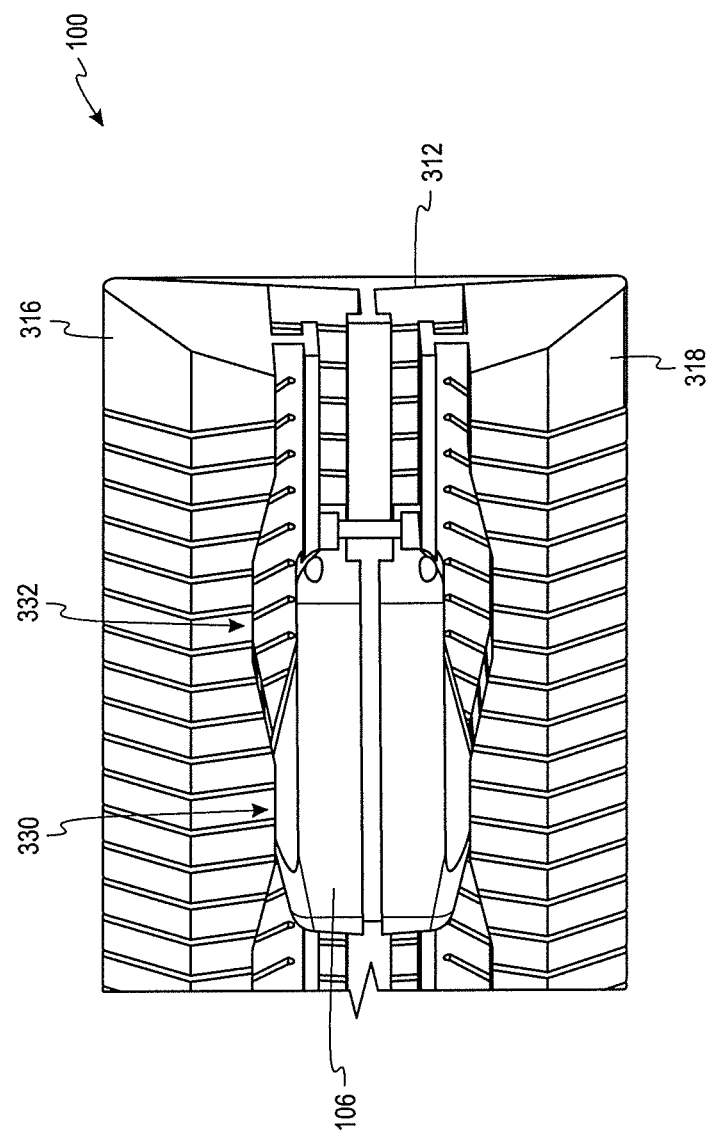
FIG. 6A illustrates a top plan view of a portion of a mandrel with the actuator in another position within the cavity of the mandrel according to an example embodiment.
Figure 6B:
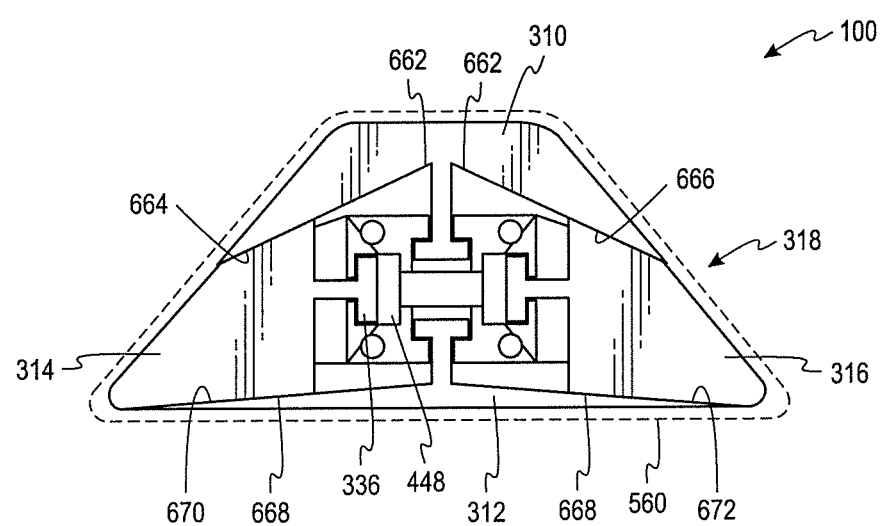
FIG. 6B illustrates an end plan view of a mandrel in an expanded state according to an example embodiment.

FIGS. 5A-5B illustrate the mandrel 100 in the contracted state and FIGS. 6A-6B illustrate the mandrel 100 in the expanded state according to an example. In FIG. 5A and FIG. 6A, the upper-mandrel portion 310 has been removed to more clearly illustrate the actuator 106 in the cavity 328 of the housing 104.

As shown in FIG. 5A, the actuator 106 is in the second position in the cavity 328 such that the flange portion 454 of the actuator 106 is positioned in the second section 332 of the cavity 328. In this example, the outer surface 446 of the actuator 106 has a width that is smaller than the width of the cavity 328 in the second section 332. In general, the actuator 106 exerts relatively little (or no) force on the first mid-mandrel portion 314 and the second mid-mandrel portion 316 when the actuator 106 is in the second position in the cavity 328.

FIG. 5B shows the mandrel 100 in the contracted state corresponding to the actuator 106 in the second position shown in FIG. 5A. In FIG. 5B, a perimeter 560 of the exterior surface 318 has the second length when the mandrel 100 is in the contracted state. Further, as shown in FIG. 5B, the guide protrusions 336 of the housing 104 are in the respective guide slots 448 of the actuator 106. More particularly, the guide protrusions 336 are in positioned in an inner portion of the guide slots 448 in FIG. 5B (i.e., a portion towards a center of the cavity 328).

To transition the mandrel 100 from the contracted state to the expanded state, the actuator 106 is moved from the second position shown in FIG. 5A to the first position shown in FIG. 6A. As shown in FIG. 6A, when the actuator 106 is in the first position in the cavity 328, the flange portion 454 of the actuator 106 is positioned in the first section 330 of the cavity 328. The outer surface 446 of the actuator 106 has a width that is greater than the width the cavity 328 in the first section 330. As such, the actuator 106 urges the first mid-mandrel portion 314 and the second mid-mandrel portion 316 outwardly away from each other when the actuator 106 is in the first position.

FIG. 6B shows the mandrel 100 in the expanded state corresponding to the actuator 106 in the first position shown in FIG. 6A. In FIG. 6B, the upper-mandrel portion 310, the lower mandrel portion 312, the first mid-mandrel portion 314, and the second mid-mandrel portion 316 have moved outwardly relative to the respective position of these components shown in FIG. 5B. For instance, in FIG. 6B, the portions 310, 312, 314, 316 have moved outwardly by a distance sufficient to cause the respective guide protrusions 336 to abut against an outer portion of the guide slots 448. The guide slots 448 and the guide protrusions 336 can thus provide a stop feature to control the extent of expansion and/or contraction for the mandrel 100. In one example, the portions 310, 312, 314, and 316 can move outwardly by a distance of approximately 1 millimeter to approximately 15 millimeters. The distance that the portions 310, 312, 314, and 316 move relative to each other can be based on the perimeter 560 (and/or an outer diameter) of the mandrel 100, which may be a limit factor for the range of movement in some implementations.

As shown in FIG. 6B, the perimeter 560 of the exterior surface 318 has the first length when the mandrel 100 is in the expanded state. As shown in FIG. 5B and FIG. 6B, the first length is greater than the second length such that the mandrel 100 has relatively larger cross-sectional dimensions in the expanded state and relatively smaller cross-sectional dimensions in the contracted state.

As also shown in FIG. 5B and FIG. 6B, the cross-sectional dimensions of the mandrel 100 are expanded in multiple directions when the mandrel 100 is transitioned from the contracted state of FIG. 5B to the expanded state of FIG. 6B. As noted above, the actuator 106 urges the first mid-mandrel portion 314 and the second mid-mandrel portion 316 outwardly away from each other as the actuator 106 moves from the second position to the first position. In the illustrated example, the first mid-mandrel portion 314 and the second mid-mandrel portion 316 urge the upper-mandrel portion 310 upwardly away from the lower-mandrel portion 312 responsive to the actuator 106 urging first mid-mandrel portion 314 and the second mid-mandrel portion 316 outwardly.

The relative movement of the upper-mandrel portion 310 can be achieved based, at least in part, on an engagement between each of the upper-mandrel portion 310 with the first mid-mandrel portion 314 and the second mid-mandrel portion 316. For instance, as shown in FIG. 6B, the upper-mandrel portion 310 has a bottom surface 662 that engages a first top surface 664 of the first mid-mandrel portion 314 and a second top surface 666 of the second mid-mandrel portion 316. The first top surface 664, the second top surface 666, and the bottom surface 662 each have a correspondingly sloped profile (e.g., relative to the longitudinal axis 322 in FIG. 3A). As such, when the first mid-mandrel portion 314 and the second mid-mandrel portion 316 move outwardly, the first top surface 664 and the second top surface 666 slide along the bottom surface 662 thereby causing the upper-mandrel portion 310 to move upward due to the sloped profile of the surfaces 662, 664, and 666.

Similarly, the first mid-mandrel portion 314 and the second mid-mandrel portion 316 can urge the lower-mandrel portion 312 downwardly away from the upper-mandrel portion 310 responsive to the actuator 106 urging first mid-mandrel portion 314 and the second mid-mandrel portion 316 outwardly. For instance, the relative movement of the lower-mandrel portion 312 can be achieved based, at least in part, on an engagement between each of the lower-mandrel portion 312 with the first mid-mandrel portion 314 and the second mid-mandrel portion 316. As shown in FIG. 6B, the lower-mandrel portion 312 has a top surface 668 that engages a first bottom surface 670 of the first mid-mandrel portion 314 and a second bottom surface 672 of the second mid-mandrel portion 316. The first bottom surface 670, the second bottom surface 672, and the top surface 668 each have a correspondingly sloped profile. As such, when the first mid-mandrel portion 314 and the second mid-mandrel portion 316 move outwardly, the first bottom surface 670 and the second bottom surface 672 slide along the top surface 668 thereby causing the lower-mandrel portion 312 to move downward due to the sloped profile of the surfaces 668, 670, and 672.

As noted above, the extent to which the mandrel 100 expands and/or contracts is based on one or more factors including, for example, the dimensions of the actuator 106, the first section 330 of the cavity 328, the second section 332 of the cavity 328, the guide protrusions 336, and/or the guide slots 448. Accordingly, in alternative examples, the actuator 106, the first section 330, the second section 332, the guide protrusions 336, and/or the guide slots 448 can have different dimensions than those illustrated in FIGS. 5B and 6B to provide for a greater or lesser extent of expansion and/or contraction of the mandrel 100.

Figure 7:
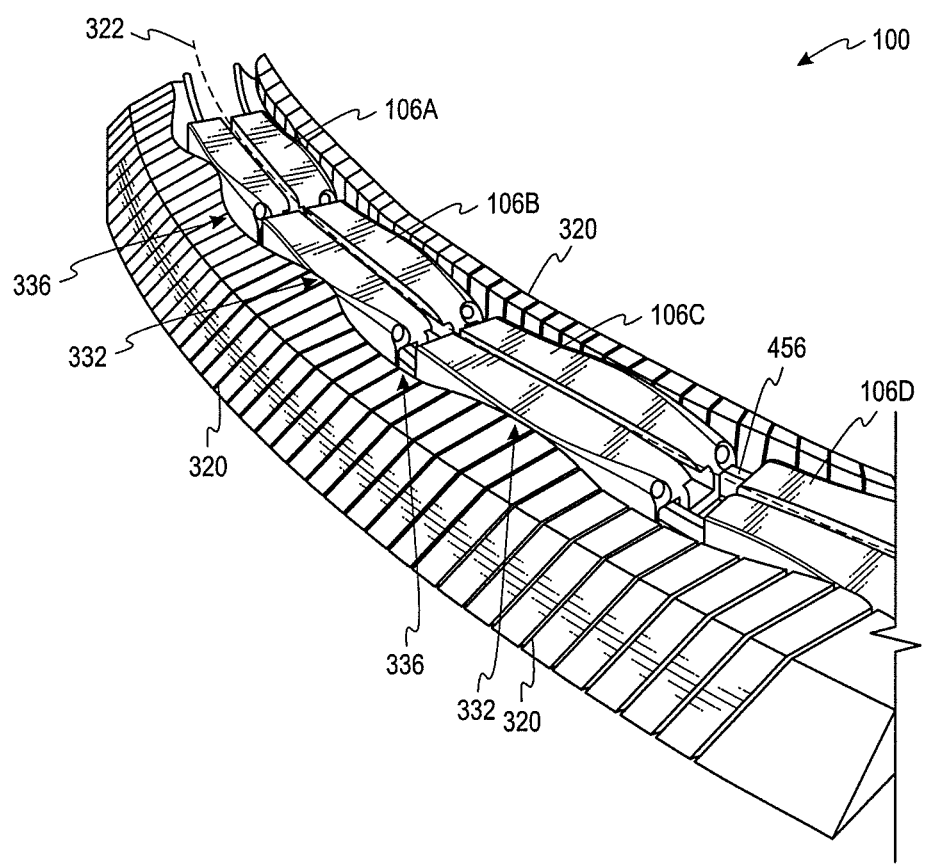
FIG. 7 illustrates a perspective view of a portion of a mandrel according to an example embodiment.

FIG. 7 illustrates a perspective view of the mandrel 100 with the upper-mandrel portion 310 removed to expose the actuator 106 in the cavity 328 according to an example. As shown in FIG. 7, the mandrel 100 is bending such that the longitudinal axis 322 has a non-linear and/or arcing contour. This bending arrangement of the mandrel 100 is facilitated by the kerfs 320 in the exterior surface 318 of the housing 104.

As also shown in FIG. 7, the actuator 106 includes a plurality of actuator segments 106A-106D that are coupled to one another by one or more linkages 456 as described above. The linkages 456 provide separation between the actuator segments 106A-106D and allow for movement of the actuator segments 106A-106D with respect to each other. As such, coupling multiple actuator sections 106A-106D to each other by the linkages 456 allows the actuator 106 to bend as well.

As further shown in FIG. 7, the cavity 328 includes a plurality of first sections 330 and a plurality of second sections 332. As such, the mandrel 100 can be repeatedly transitioned back and forth between the contracted state and the expanded state by moving the actuator in a single direction in the cavity 328. This can provide for simple and efficient actuation of the mandrel 100 between the contracted and expanded states.

In operation, the mandrel 100 can be contracted to insert in the interior space 204 of the composite 200 and/or remove the mandrel 100 from the interior space 204 of the composite part 200, and the mandrel 100 can be expanded to support the composite part 200 during a process for forming the composite part 200 and/or a process for repairing the composite part 200. As described above, the mandrel 100 is operated by moving the actuator 106 between the first position in the cavity 328 and the second position in the cavity 328 to expand and contract the mandrel 100 between the expanded state and the contracted state, respectively.

FIGS. 8A-8D are cross-sectional end views illustrating various stages of a method for forming a composite part 800 using the mandrel 100 according to an example. In the illustrated example, the composite part 800 is a hat-shaped stringer 802 co-cured to a fuselage skin 808; however, the composite part 800 can have a different shape and/or configuration in other examples.

Figure 8A:
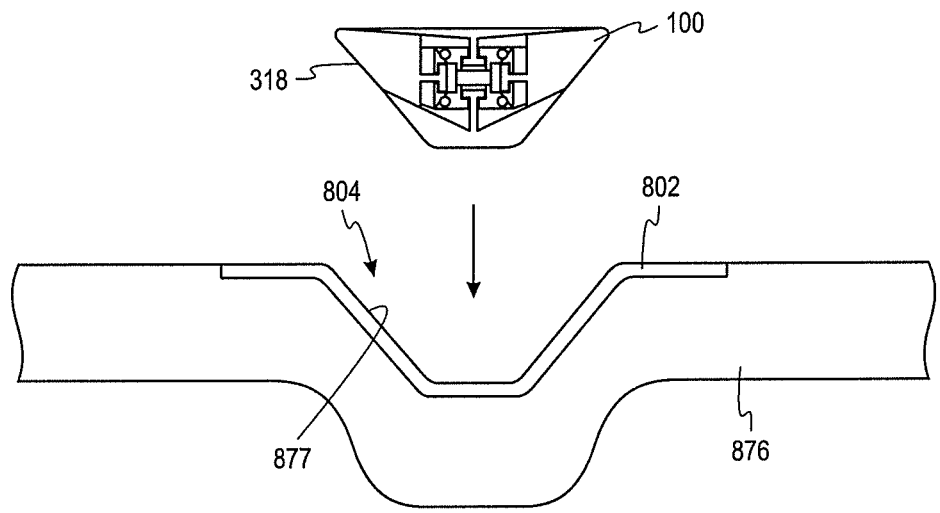
FIG. 8A illustrates a cross-sectional end view of a first stage of a method for forming a composite part with a mandrel according to an example embodiment.

As shown in FIG. 8A, the stringer 802 is positioned in a trough 876. The trough 876 includes a groove with a generally trapezoidal hat-shaped cross-section, which provides a form for shaping and/or supporting the stringer 802. The stringer 802 can include a plurality of layers of composite material in an example.

In the trough 876, the stringer 802 has an interior surface 877 that defines an interior space 804. The mandrel 100 is positioned in the interior space 804 of the stringer 802 in the expanded state so that the exterior surface 318 of the mandrel 100 is in supporting contact with the interior surfaces 877 of the stringer 802. Thus, the actuator 106 can be in the first position in the cavity 328 to configure the mandrel 100 in the expanded state. In FIG. 8A, the mandrel 100 is in the expanded state while the mandrel 100 is positioned in the interior space 804; however, the mandrel 100 can be positioned in the interior space 804 in the contracted state and then expanded to the expanded state in the interior space 804 in other examples.

Figure 8B:
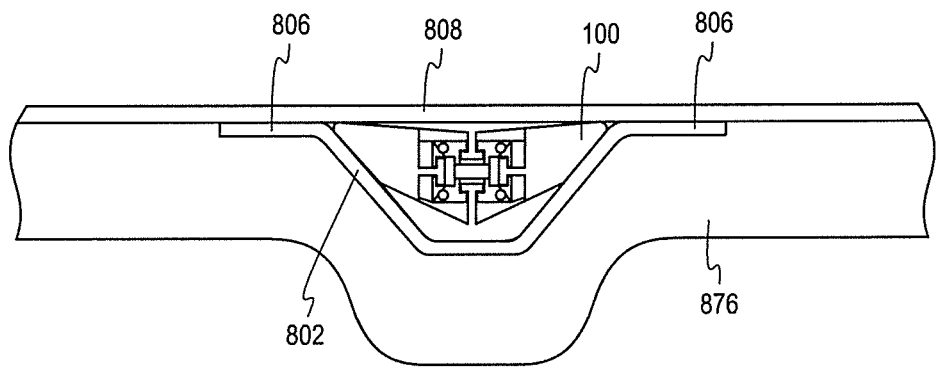
FIG. 8B illustrates a cross-sectional end view of a second stage of a method for forming a composite part with a mandrel according to an example embodiment.

FIG. 8B shows the mandrel 100 positioned in the interior space 804 while the mandrel 100 is in the expanded state. As shown in FIG. 8B, once the mandrel 100 is positioned in the interior space 804 of the stringer 802, a fuselage skin 808 is laminated over the trough 876, end flange sections 806 of the stringer 802, and the mandrel 100.

The fuselage skin 808 is then co-cured with the stringer 802 by applying heat and pressure in an autoclaving or a similar process. In general, co-curing causes the fuselage skin 808 to become bonded to the flange sections 806 of the stringer 802 and the exterior surface 318 of the mandrel 100. With the mandrel 100 in the interior space 804 while in the expanded state, the exterior surface 318 of the mandrel 100 can facilitate maintaining the shape of the stringer 802 under compressive forces applied during co-curing.

Figure 8C:
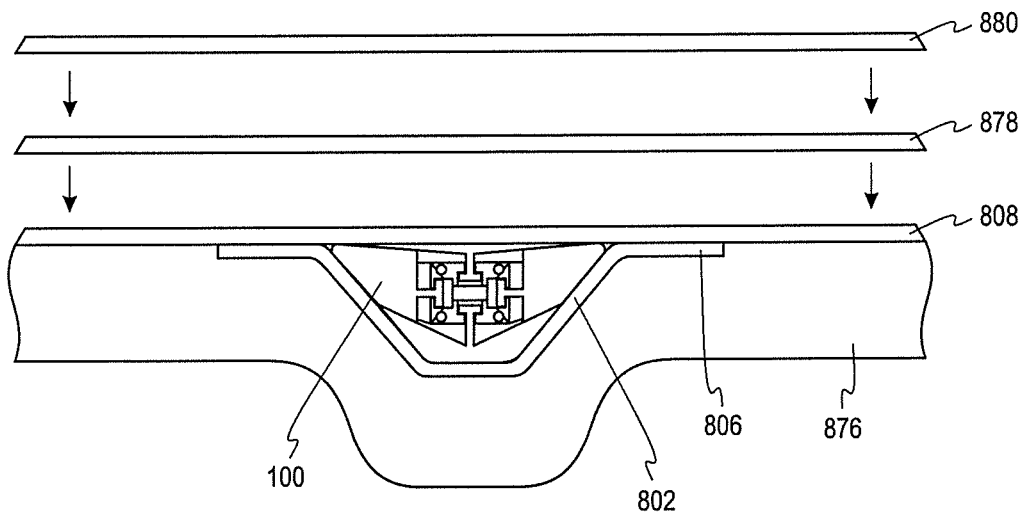
FIG. 8C illustrates a cross-sectional end view of a third stage of a method for forming a composite part with a mandrel according to an example embodiment.

FIG. 8C illustrates an example step for co-curing the fuselage skin 808 and the stringer 802. FIG. 8C shows co-curing by first positioning a caul sheet 878 over the fuselage skin 808, and positioning a vacuum bag 880 over the caul sheet 878 and the fuselage skin 808 to form a pressurized environment for autoclaving. The air space between the vacuum bag 880 and the fuselage skin 808 is then evacuated to apply an even pressure against the fuselage skin 808, the flange sections 806 of the stringer 802, and the exterior surface 318 of the mandrel 100. The fuselage skin 808 is then co-cured to the flange sections 806 of the stringer 802 at a curing temperature using an autoclave while under vacuum.

Figure 8D:
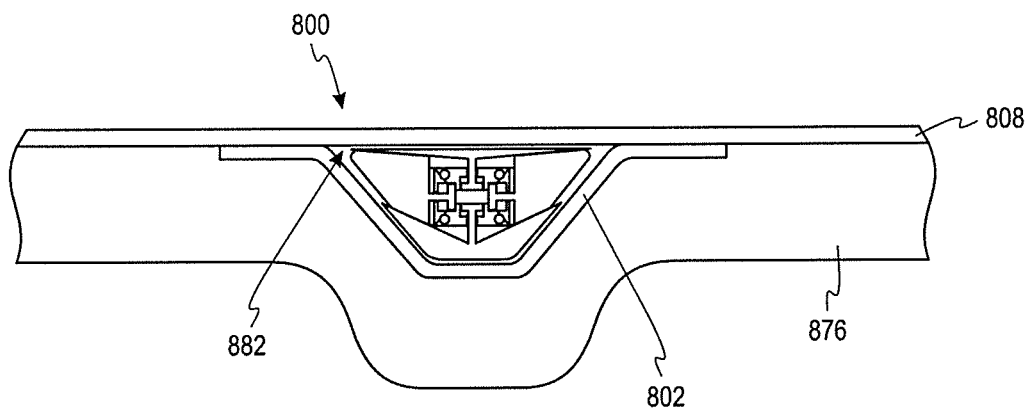
FIG. 8D illustrates a cross-sectional end view of a fourth stage of a method for forming a composite part with a mandrel according to an example embodiment.

FIG. 8D illustrates a stage of the fabrication process after co-curing is completed. As shown in FIG. 8D, the fuselage skin 808 is separated from the caul sheet 878 and the vacuum bag 880, the mandrel 100 is contracted to the contracted state. As such, the actuator 106 can be moved from the first position to the second position in the cavity 328 to contract the mandrel 100 from the expanded state to the contracted state.

As also shown in FIG. 8D, when the mandrel 100 is in the contracted state, a gap 882 is present between the mandrel 100 and the stringer 802 as the size of the mandrel 100 in the contracted state is smaller than the size of the interior space 804. The smaller size of the mandrel 100 in the contracted state provides for easy removal of the mandrel 100 from the interior space 804 with relatively little risk of damage to the composite part 800.

In the example of FIGS. 8A-8D, the mandrel 100 remained in the interior space 804 curing cure. This allows the mandrel 100 in the expanded state to support the composite part 800 against the pressures applied during the cure process. In an alternative example, the mandrel 100 can be removed from the interior space 804 prior to cure. For instance, after positioning the fuselage skin 808 on the stringer 802, the mandrel 100 can be collapsed and withdrawn from the interior space 804 and then curing can be performed. This may be possible where an autoclave is used to apply equal pressure to the composite part 800 inside and outside of the interior space 804. By removing the mandrel 100 prior to cure, the mandrel 100 is not subjected to the increased temperatures and pressures of the cure process, which may extend the useful life of the mandrel 100.

Figure 9A:
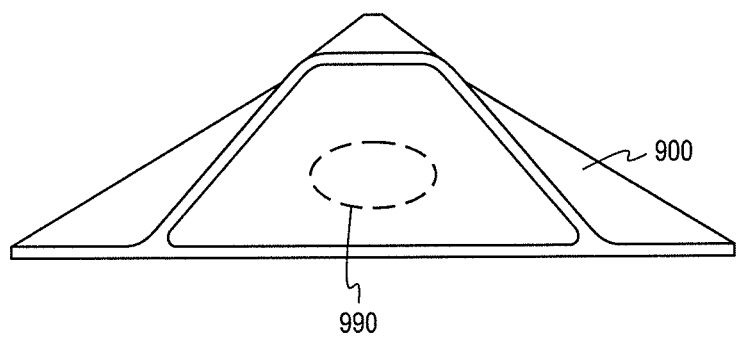
FIG. 9A illustrates an end view of a first stage of a method for repairing a composite part with a mandrel according to an example embodiment.
Figure 9B:
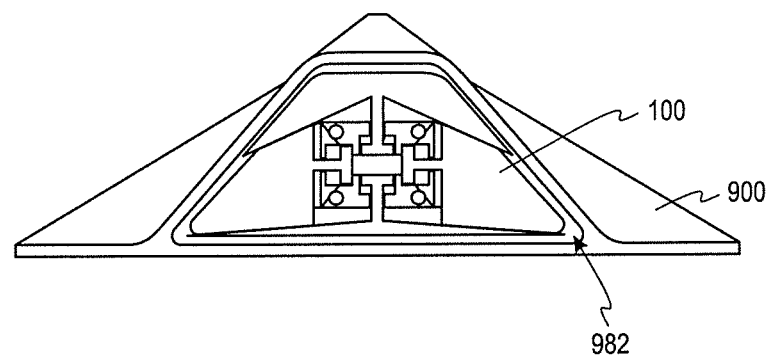
FIG. 9B illustrates an end view of a second stage of a method for repairing a composite part with a mandrel according to an example embodiment.
Figure 9C:
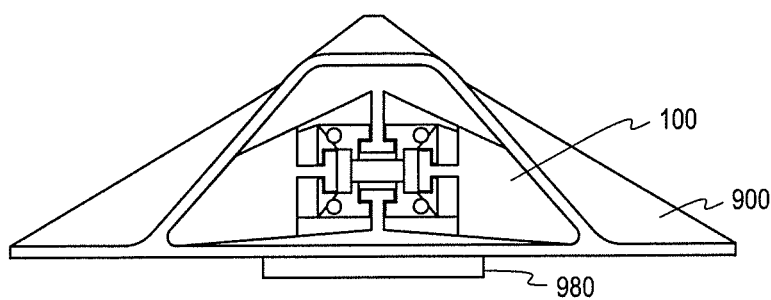
FIG. 9C illustrates an end view of a third stage of a method for repairing a composite part with a mandrel according to an example embodiment.

FIGS. 9A-9C illustrate an end view of various stage of a method for repairing a composite part 900. As shown in FIG. 9A, the composite part 900 is a hat-shaped stringer 902 co-cured to a fuselage skin 908. The composite part 900 also includes an interior space 904 between the stringer 902 and the fuselage skin 908. The composite part 900 includes a damaged area 990 on the fuselage skin 908.

To repair the composite part 900, the damaged area 990 can be scarfed. Additionally, the mandrel 100 can be configured in the contracted state and then inserted into the interior space 904 of the composite part 900. The actuator 106 can be in the second position in the cavity 328 to configure the mandrel 100 in the contracted state.

FIG. 9B shows the mandrel 100, in the contracted state, inserted into the interior space 904 of the composite part 900. As shown in FIG. 9B, a gap 982 exists between the mandrel 100 and the composite part 900 as the size of the mandrel 100 in the contracted state is smaller than the size of the interior space 904. The smaller size of the mandrel 100 in the contracted state provides for easy insertion of the mandrel 100 in the interior space 904 with relatively little risk of further damage to the composite part 900.

After inserting the mandrel 100 in the interior space 904 of the composite part 900, the actuator 106 is moved from the second position to the first position to expand the mandrel 100 from the contracted state to the expanded state. FIG. 9C shows the mandrel 100 in the interior space 904 after the mandrel 100 is expanded to the expanded state. As shown in FIG. 9C, while the mandrel 100 is in the expanded state, the exterior surface 318 of the mandrel 100 is in supporting contact with the composite part 900. As such, the gap 982 is reduced or eliminated.

While the mandrel 100 is in the expanded state, repair operations can be performed on the composite part 900. As an example, an uncured material can be applied to the damaged area 990 and then cured. For instance, a vacuum bag 980 can be applied to the material at the damaged area 990 to cure the material and repair the composite part 900.

After repairing the composite part, the actuator 106 is moved from the first position to the second position to contract the mandrel 100 from the expanded state back to the contracted state as shown in FIG. 9B. In the contracted state, the gap 982 between the mandrel 100 and the composite part 900 is again present. In the contracted state, the mandrel 100 can be easily removed from the interior space 904 with relatively little risk of damaging the composite part 900.

Figure 10:
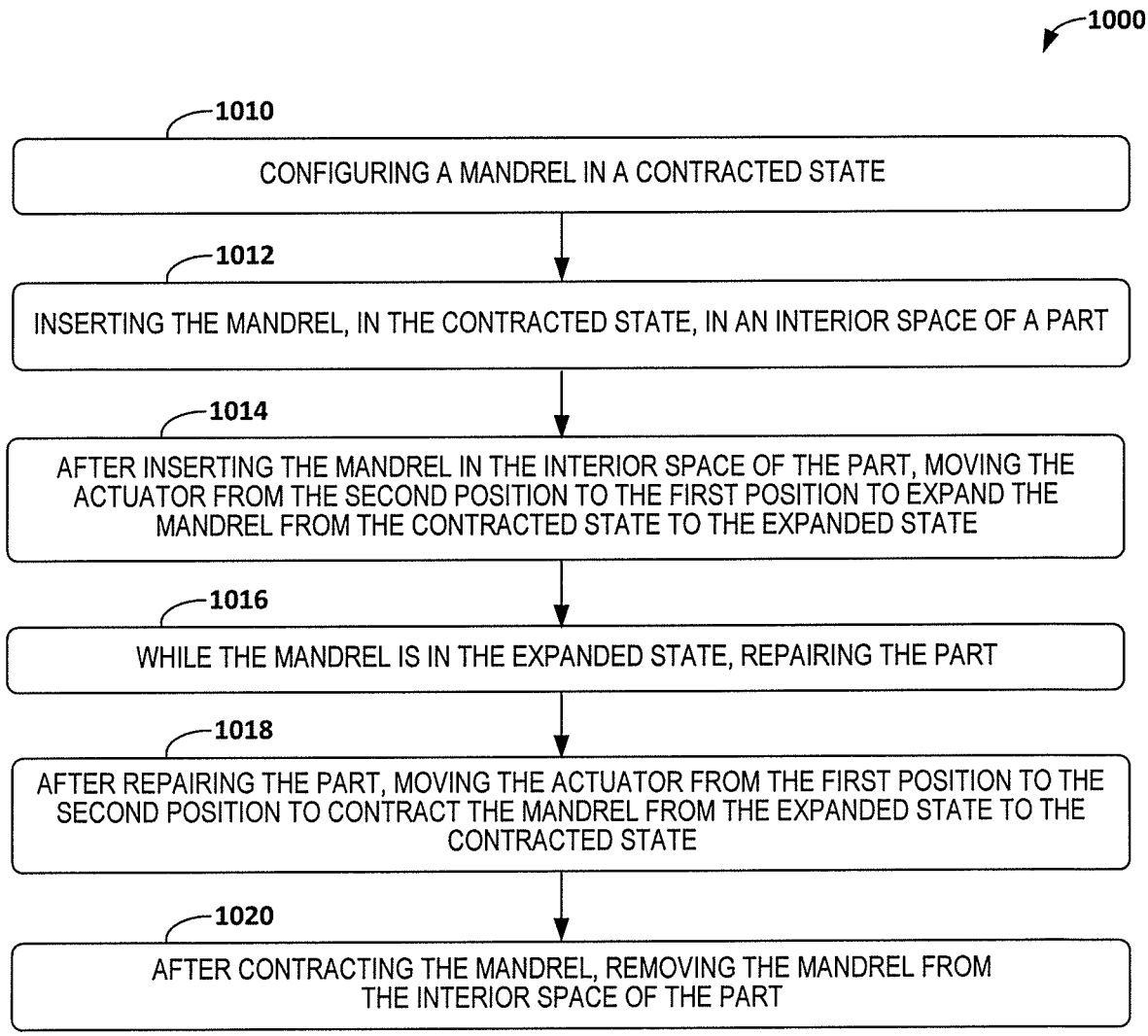
FIG. 10 illustrates a flow chart of an example process for forming a composite part, according to an example embodiment.

FIG. 10 depicts a flowchart of a method 1000 for repairing a part with a mandrel according to an example. As shown in FIG. 10, the method 1000 includes configuring a mandrel in a contracted state at block 1010. The mandrel includes an upper-mandrel portion, a lower-mandrel portion, and a mid-mandrel portion between the upper-mandrel portion and the lower-mandrel portion. The mandrel also includes a cavity defined by the upper-mandrel portion, the lower-mandrel portion, and the mid-mandrel portion. The mandrel further includes an actuator, which is movable in the cavity between a first position in the cavity and a second position in the cavity, and an exterior surface defined by the upper-mandrel portion, the lower-mandrel portion, and the mid-mandrel portion. A perimeter of the exterior surface has a first length when the actuator is in the first position in the cavity and the perimeter has a second length when the actuator is in the second position in the cavity. The first length is greater than the second length such that the mandrel is in an expanded state when the actuator is in the first position and the mandrel is in the contracted state when the actuator is in the second position.

At block 1012, the method 1000 includes inserting the mandrel, in the contracted state, in an interior space of a part. After inserting the mandrel in the interior space of the part at block 1012, the method 1000 includes moving the actuator from the second position to the first position to expand the mandrel from the contracted state to the expanded state at block 1014. While the mandrel is in the expanded state, the method includes repairing the part at block 1016. After repairing the part at block 1016, the method 1000 includes moving the actuator from the first position to the second position to contract the mandrel from the expanded state to the contracted state at block 1018. After contracting the mandrel at block 1018, the method 1000 includes removing the mandrel from the interior space of the part at block 1020.

Figure 11:
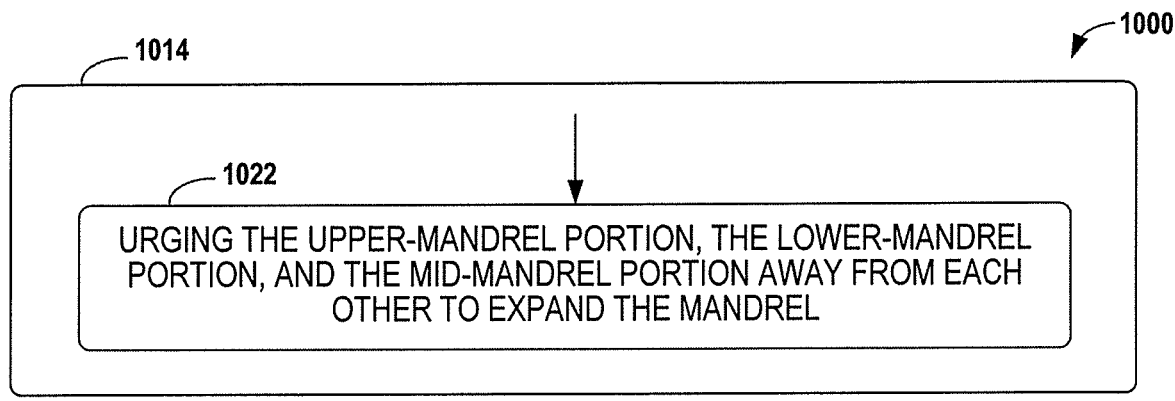
FIG. 11 illustrates a flow chart of an example process for forming a composite part, according to an example embodiment.
Figure 12:
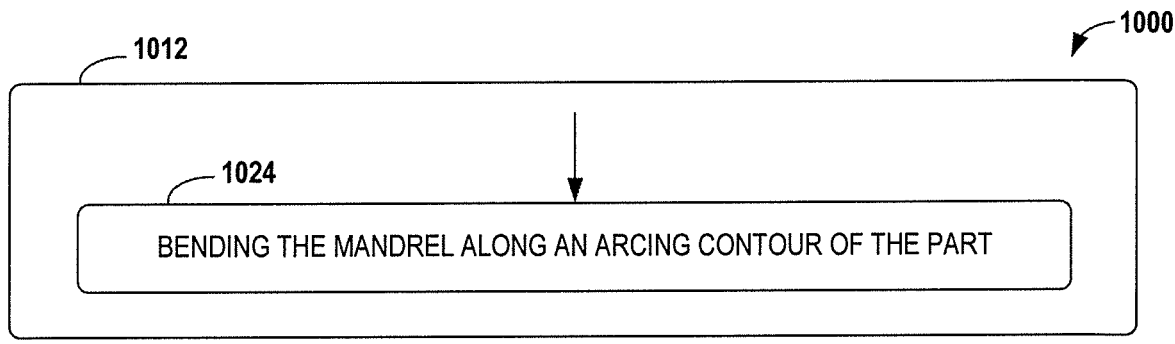
FIG. 12 illustrates a flow chart of an example process for forming a composite part, according to an example embodiment.
Figure 13:
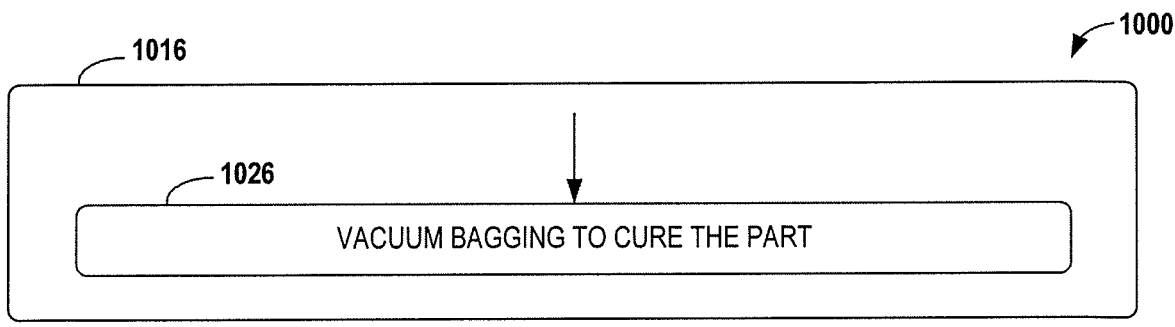
FIG. 13 illustrates a flow chart of an example process for forming a composite part, according to an example embodiment.

FIGS. 11-13 depict additional aspects of the method 1000 according to further examples. As shown in FIG. 11, moving the actuator from the second position to the first position at block 1014 includes urging the upper-mandrel portion, the lower-mandrel portion, and the mid-mandrel portion outwardly away from each other to expand the mandrel at block 1022.

As shown in FIG. 12, inserting the mandrel in the interior space of the part at block 1012 includes bending the mandrel along an arcing contour of the part at block 1024. In an example, the upper-mandrel portion, the lower-mandrel portion, and the mid-mandrel portion include a plurality of kerfs along a longitudinal axis extending from a first end of the mandrel to a second end of the mandrel to facilitate bending the mandrel at block 1024.

As shown in FIG. 13, repairing the part at block 1016 includes vacuum bagging to cure the part at block 1026.

Figure 14:
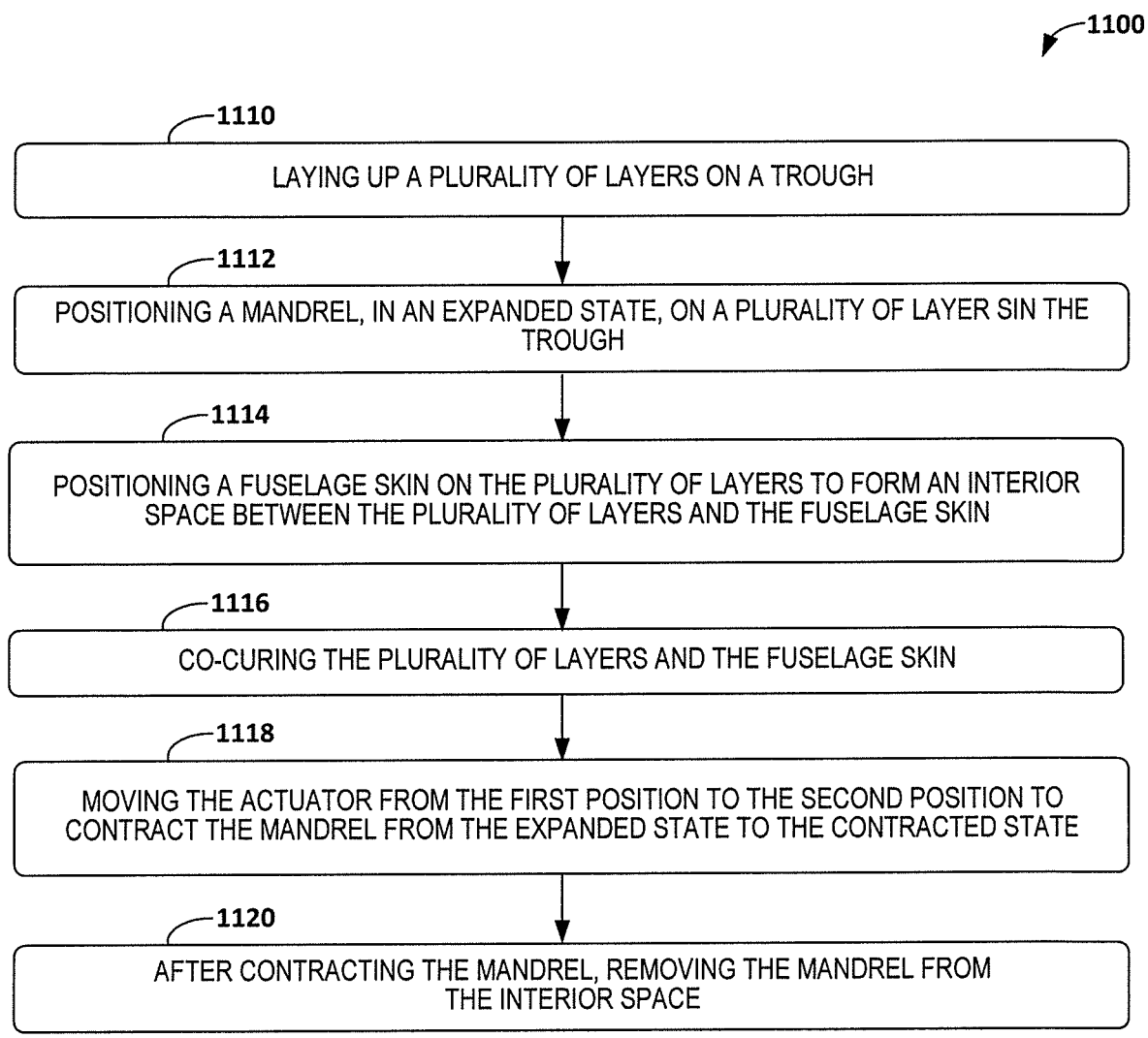
FIG. 14 illustrates a flow chart of an example process for repairing a composite part, according to an example embodiment.

FIG. 14 depicts a flowchart of a method 1100 of forming a part with a mandrel according to an example. As shown in FIG. 14, the method 1100 includes laying up a plurality of layers on a trough at block 1110. At block 1112, the method 1100 includes positioning a mandrel, in an expanded state, on the plurality of layers in the trough.

The mandrel includes an upper-mandrel portion, a lower-mandrel portion, and a mid-mandrel portion between the upper-mandrel portion and the lower-mandrel portion. The mandrel also includes a cavity defined by the upper-mandrel portion, the lower-mandrel portion, and the mid-mandrel portion. The mandrel further includes an actuator, which is movable in the cavity between a first position in the cavity and a second position in the cavity, and an exterior surface defined by the upper-mandrel portion, the lower-mandrel portion, and the mid-mandrel portion. A perimeter of the exterior surface has a first length when the actuator is in the first position in the cavity and the perimeter has a second length when the actuator is in the second position in the cavity. The first length is greater than the second length such that the mandrel is in an expanded state when the actuator is in the first position and the mandrel is in the contracted state when the actuator is in the second position.

At block 1114, the method 1100 includes positioning a fuselage skin on the plurality of layers to form an interior space between the plurality of layers and the fuselage skin. The mandrel is in the interior space. At block 1116, the method 1100 includes co-curing the plurality of layers and the fuselage skin. At block 1118, the method 1100 includes moving the actuator from the first position to the second position to contract the mandrel from the expanded state to the contracted state. After contracting the mandrel at block 1118, the method 1100 includes removing the mandrel from the interior space at block 1120.

In one example, contracting and removing the mandrel at blocks 1118 and 1120 are performed after co-curing the plurality of layers at block 1116. In another example, contracting and removing the mandrel at blocks 1118 and 1120 are performed before co-curing the plurality of layers at block 116.

Figure 15:
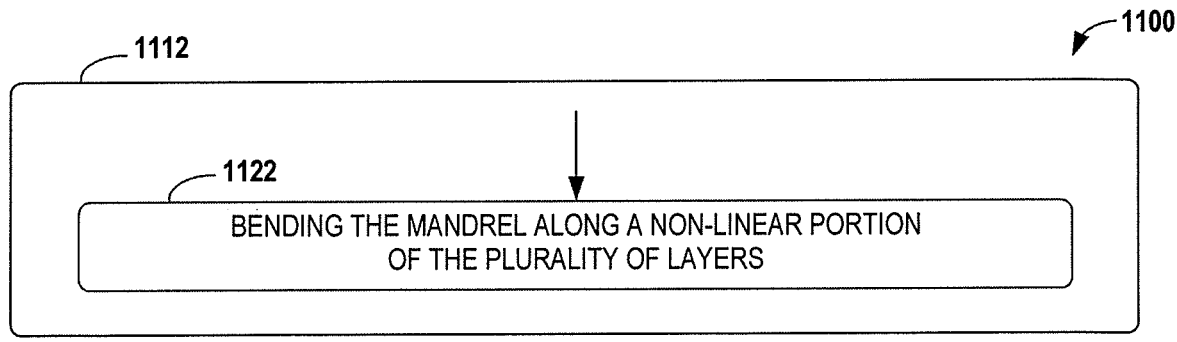
FIG. 15 illustrates a flow chart of an example process for repairing a composite part, according to an example embodiment.

FIG. 15 depicts additional aspects of the method 1100 according to further examples. As shown in FIG. 15, the positioning the mandrel on the plurality of layers at block 1112 includes bending the mandrel along a non-linear portion of the plurality of layers at block 1122. In an example, the upper-mandrel portion, the lower-mandrel portion, and the mid-mandrel portion include a plurality of kerfs along a longitudinal axis extending from a first end of the mandrel to a second end of the mandrel to facilitate bending the mandrel at block 1022.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Additionally, the method 1000 and 1100 shown in FIGS. 10-15 depict examples of a method that can be used for the mandrel 100 shown in FIG. 1-7. In some examples, components of the mandrel 100 may be arranged to be adapted to, capable of, or suited for performing the functions, such as when operated in a specific manner. In additional or alternative examples, the methods 1000 and 1100 can include one or more operations, functions, or actions as illustrated in FIGS. 10-15. Although the blocks of these Figures are illustrated in a sequential order, these blocks may also be performed in parallel, and/or in a different order than those described herein. Also, the various blocks may be combined into fewer blocks, divided into additional blocks, and/or removed based upon the desired implementation.

Further, in the example of FIGS. 1-9C, the mandrel 100 has a generally trapezoidal shape to conform to a correspondingly shaped interior space 204, 804, 904 of the composite part 200, 800, 900; however, the mandrel 100 can have a different shape to conform to differently shaped composite part in other examples.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Similarly, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

Within examples, the mandrel 100 can be used during manufacture of composite parts, or during repair of composite parts. Embodiments of the disclosure may find use in a variety of potential applications, particularly in the transportation industry, including for example, aerospace, marine, automotive applications and other application where autoclave curing of composite parts may be used. As one example, embodiments of the disclosure may be used in the context of an aircraft manufacturing and service. Aircraft applications of the disclosed embodiments may include, for example, without limitation, curing of stiffener members such as, without limitation beams, spars and stringers, to name only a few.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A mandrel for a composite part, comprising:
   an upper-mandrel portion;
   a lower-mandrel portion;
   a mid-mandrel portion between the upper-mandrel portion and the lower-mandrel portion;
   a cavity defined by the upper-mandrel portion, the lower-mandrel portion, and the mid-mandrel portion;
   an actuator movable in the cavity between a first position in the cavity and a second position in the cavity; and
   an exterior surface defined by the upper-mandrel portion, the lower-mandrel portion, and the mid-mandrel portion, wherein the exterior surface is configured to support the composite part,
   wherein a perimeter of the exterior surface has a first length when the actuator is in the first position in the cavity and the perimeter has a second length when the actuator is in the second position in the cavity, and
   wherein the first length is greater than the second length such that the mandrel is in an expanded state when the actuator is in the first position and the mandrel is in a fully contracted state when the actuator is in the second position.

2. The mandrel of claim 1, wherein the upper-mandrel portion, the lower-mandrel portion, and the mid-mandrel portion each have a plurality of kerfs along a longitudinal axis extending from a first end of the mandrel to a second end of the mandrel.

3. The mandrel of claim 2, wherein the plurality of kerfs of the mid-mandrel portion extend from the lower-mandrel portion to the upper-mandrel portion at an angle in a direction from the first end to the second end.

4. The mandrel of claim 1, wherein the mid-mandrel portion comprises a first mid-mandrel portion and a second mid-mandrel portion on opposing sides of the cavity.

5. The mandrel of claim 4, wherein the actuator urges the first mid-mandrel portion and the second mid-mandrel portion outwardly away from each other as the actuator moves from the second position to the first position, and
   wherein the first mid-mandrel portion and the second mid-mandrel portion urge the upper-mandrel portion upwardly away from the lower-mandrel portion responsive to the actuator urging first mid-mandrel portion and the second mid-mandrel portion outwardly.

6. The mandrel of claim 5, wherein the upper-mandrel portion has a bottom surface that engages a first top surface of the first mid-mandrel portion and a second top surface of the second mid-mandrel portion, and
   wherein the first top surface, the second top surface, and the bottom surface each have a sloped profile,
   wherein the engagement of the bottom surface with the first top surface and the second top surface urges the upper-mandrel portion upwardly responsive to the actuator urging first mid-mandrel portion and the second mid-mandrel portion outwardly.

7. The mandrel of claim 5, wherein the first mid-mandrel portion and the second mid-mandrel portion urge the lower-mandrel portion downwardly away from the upper-mandrel portion responsive to the actuator urging first mid-mandrel portion and the second mid-mandrel portion outwardly.

8. The mandrel of claim 1, wherein the cavity comprises a first section and a second section, and
   wherein a width of the cavity in the first section is smaller than the width of the cavity in the second section.

9. The mandrel of claim 8, wherein an outer surface of the actuator has a width that is smaller than the width of the cavity in the second section and greater than the width of the cavity in the first section.

10. The mandrel of claim 1, further comprising:
a plurality of guide protrusions extending into the cavity from the upper-mandrel portion, the mid-mandrel portion, and the lower-mandrel portion; and
a plurality of guide slots on the actuator,
wherein each of the plurality of guide slots receives a respective one of the plurality of guide protrusions to guide movement of the actuator between the first position and the second position.

11. The mandrel of claim 10, wherein the plurality of guide protrusions and the plurality of guide slots are T-shaped.

12. The mandrel of claim 1, wherein the actuator comprises a plurality of segments coupled to each other by a plurality of linkages to allow the actuator to bend.

13. A method of repairing a part with a mandrel, comprising:
configuring a mandrel in a fully contracted state, wherein the mandrel comprises:
an upper-mandrel portion,
a lower-mandrel portion,
a mid-mandrel portion between the upper-mandrel portion and the lower-mandrel portion,
a cavity defined by the upper-mandrel portion, the lower-mandrel portion, and the mid-mandrel portion, and
an actuator movable in the cavity between a first position in the cavity and a second position in the cavity;
an exterior surface defined by the upper-mandrel portion, the lower-mandrel portion, and the mid-mandrel portion,
wherein a perimeter of the exterior surface has a first length when the actuator is in the first position in the cavity and the perimeter has a second length when the actuator is in the second position in the cavity, and
wherein the first length is greater than the second length such that the mandrel is in an expanded state when the actuator is in the first position and the mandrel is in the fully contracted state when the actuator is in the second position;
inserting the mandrel, in the fully contracted state, in an interior space of a part;
after inserting the mandrel in the interior space of the part, moving the actuator from the second position to the first position to expand the mandrel from the fully contracted state to the expanded state;
while the mandrel is in the expanded state, repairing the part;
after repairing the part, moving the actuator from the first position to the second position to contract the mandrel from the expanded state to the fully contracted state; and
after contracting the mandrel, removing the mandrel from the interior space of the part.

14. The method of claim 13, wherein moving the actuator from the second position to the first position comprises urging the upper-mandrel portion, the lower-mandrel portion, and the mid-mandrel portion outwardly away from each other to expand the mandrel.

15. The method of claim 13, wherein inserting the mandrel in the interior space of the part comprises bending the mandrel along an arcing contour of the part,
wherein the upper-mandrel portion, the lower-mandrel portion, and the mid-mandrel portion comprise a plurality of kerfs along a longitudinal axis extending from a first end of the mandrel to a second end of the mandrel to facilitate bending the mandrel.

16. The method of claim 13, wherein repairing the part comprises vacuum bagging to cure the part.

17. A method of forming a part with a mandrel, comprising:
laying up a plurality of layers on a trough;
positioning a mandrel, in an expanded state, on the plurality of layers in the trough, wherein the mandrel comprises:
an upper-mandrel portion,
a lower-mandrel portion,
a mid-mandrel portion between the upper-mandrel portion and the lower-mandrel portion,
a cavity defined by the upper-mandrel portion, the lower-mandrel portion, and the mid-mandrel portion,
an actuator movable in the cavity between a first position in the cavity and a second position in the cavity, and
an exterior surface defined by the upper-mandrel portion, the lower-mandrel portion, and the mid-mandrel portion,
wherein a perimeter of the exterior surface has a first length when the actuator is in the first position in the cavity and the perimeter has a second length when the actuator is in the second position in the cavity, and
wherein the first length is greater than the second length such that the mandrel is in the expanded state when the actuator is in the first position and the mandrel is in a fully contracted state when the actuator is in the second position;
positioning a fuselage skin on the plurality of layers to form an interior space between the plurality of layers and the fuselage skin, wherein the mandrel is in the interior space;
co-curing the plurality of layers and the fuselage skin;
moving the actuator from the first position to the second position to contract the mandrel from the expanded state to the fully contracted state; and
after contracting the mandrel, removing the mandrel from the interior space.

18. The method of claim 17, wherein contracting and removing the mandrel are before co-curing the plurality of layers.

19. The method of claim 17, wherein contracting and removing the mandrel are after co-curing the plurality of layers.

20. The method of claim 17 wherein the upper-mandrel portion, the lower-mandrel portion, and the mid-mandrel portion each have a plurality of kerfs along a longitudinal axis extending from a first end of the mandrel to a second end of the mandrel, and
wherein positioning the mandrel on the plurality of layers comprises bending the mandrel along a non-linear portion of the plurality of layers.

* * * * *